Feb. 11, 1941. E. EGER 2,231,182

PNEUMATIC TIRE INNER TUBE

Filed Jan. 5, 1939

INVENTOR.
ERNST EGER
BY Gourley & Budlong
ATTORNEYS.

Patented Feb. 11, 1941

2,231,182

UNITED STATES PATENT OFFICE 2,231,182

PNEUMATIC TIRE INNER TUBE

Ernst Eger, Grosse Pointe Park, Mich., assignor to United States Rubber Company, New York, N. Y., a corporation of New Jersey Application January 5, 1939, Serial No. 249,383

1 Claim. (Cl. 152—349)

This invention relates to pneumatic tires, and in particular it relates to inner tubes for association with a pneumatic tire and a rim. More particularly, the invention relates to an inner tube having flaps with free ends extending from the wall of the inner tube and which are adaptable to engage a portion of a tire and a rim in a substantially unstrained condition upon inflation of the inner tube.

In pneumatic tires, particularly of the heavy service type, considerable difficulty has been experienced because of failure of inner tubes in a region at the junction of the tire with the rim. In pneumatic tire assemblies including rims of the drop center type conventional inner tubes, when assembled therein and inflated, cause movement of the inner tube walls from within the confines of a tire to engagement with the rim well. This movement results in stretching the wall of the inner tube over that region of the assembly where the tire engages the rim. The assembly of the tire and rim does not always form a smooth joint at a point of engagement at the inner wall of the tire. Furthermore, when the tire is in operation a slight relative movement occurs between the tire beads and the rim. This condition tends to chafe the wall of the inner tube and frequently results in failure of the tube. As hereinbefore stated, the wall of the inner tube in the region of the joint between the tire and the rim is usually in a stretched condition, and as rubber compositions in a stretched condition are usually more susceptible to abrasion than when in their normal state, the possibility of failure of the inner tube is considerably increased.

Figure 1:
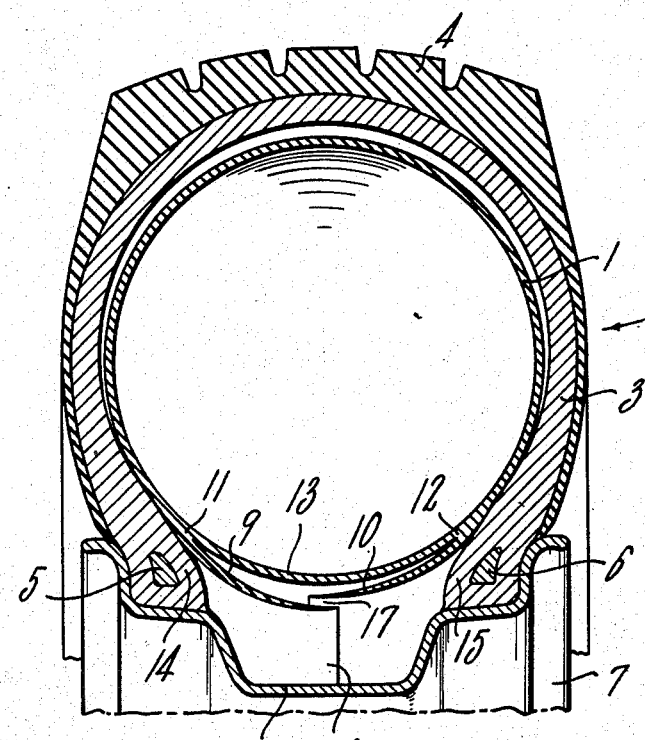
Figure 2:
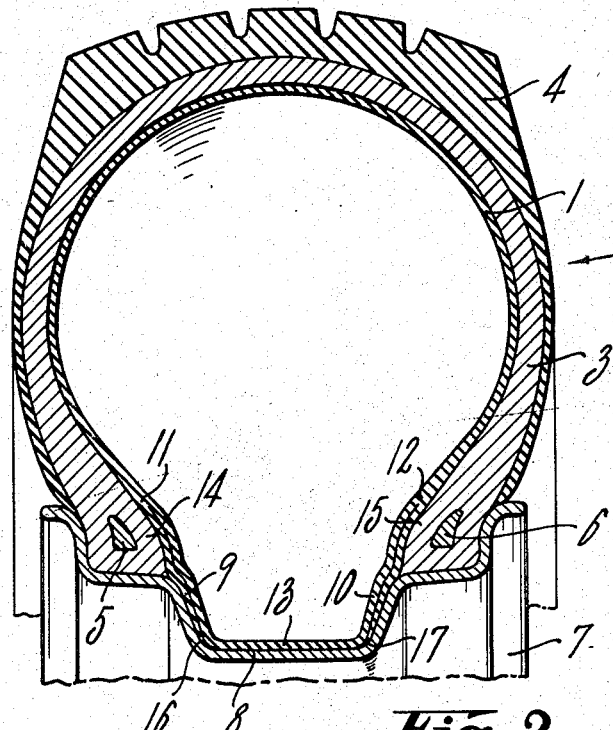

Among the objects of my invention are, to prevent failure of inner tubes resulting from abrasion at the junction of the tire and rim; to provide an inner tube which may be assembled with a tire and a rim in the same manner as conventional tubes; to provide a tube which may be manufactured economically and assembled efficiently with a tire and rim; and, to provide an inner tube which will function in substantially the same manner as a conventional inner tube, but which includes the feature of an additional wall substantially free from the stretch to which inner tubes are subjected, this additional wall being positioned in a tire assembly at abrasion producing locations. These and other objects and advantages will appear more fully in the following detailed description when considered in connection with the accompanying drawing, in which:

Fig. 1 is a transverse view, in section, of a pneumatic tire and rim, illustrating an inner tube embodying the features of my invention assembled therewith; and, Fig. 2 is a similar view illustrating the inner tube in an inflated condition.

Referring to the drawing, and in particular to Fig. 1, I show an embodiment of my invention in the form of an inner tube 1 assembled with a pneumatic tire 2 comprising a carcass 3, tread 4, and inextensible bead members 5 and 6. The tire 2 is assembled with a rim 7 including a well 8 characteristic of the conventional type of drop center rims. The inner tube 1 of rubber composition includes flaps 9 and 10 attached integrally to the wall of the inner tube 1 at locations 11 and 12, respectively.

The numeral 13 indicates that portion of the inner tube between the junctures 11 and 12 which is hereinafter referred to as the rim region, and includes that part which customarily engages with the tire rim when the inner tube is assembled thereon and inflated.

The point of engagement of the flaps 9 and 10 with the wall of the inner tube 1 is located adjacent to the portion 13 defined as the rim region. More specifically, the joints 11 and 12 formed with the flaps 9 and 10, respectively, are located in close proximity with the bead portions 14 and 15, respectively, of the tire 2. The flaps 9 and 10, which are preferably of a rubber composition similar to that of the inner tube 1, have free edges 16 and 17, respectively, and taper in thickness from the joints 11 and 12 to the free edges which are relatively thin. As shown in Fig. 1, these flaps 9 and 10 extend inwardly toward the central plane of rotation of the tire, tube and supporting rim and having their free edges overlapping each other; however, it is not necessary to overlap the flaps if they are of sufficient length to form a protective wall over the joint between the bead portions of the tire and the rim.

An inner tube of this type may be manufactured in an extruding operation in which the inner tube and flaps are extruded in an integral unit. A preferred method of manufacturing the inner tube is to extrude the tubular member of the tube as a unit, and attach the flaps to the inner tube while in an unvulcanized state. Lubricating material such as soapstone may be applied to those portions of the flap or inner tube to which adhesion is not desired, and the flaps and inner tube vulcanized simultaneously. The flaps, after vulcanizing, tend to retain their curved contour and lie close to the wall of the tube. Thus it will be seen that the improved tube and flaps in no way interfere with the assembly of the tire and tube upon the supporting rim.

Inner tubes are usually manufactured so that, when assembled with a pneumatic tire, they lie wholly within the chamber defined by the interior of the tire casing. In Fig. 1 the relationship of an uninflated inner tube and flaps with the tire assembly is shown. When the inner tube is inflated, as shown in Fig. 2, the initial inflation pressure will usually be sufficient to cause the wall of the inner tube to engage firmly against the surface of the beads. Thus, the rim portion 13 of the inner tube undergoes considerable stretching as it moves into position in contact with the well 8 of the rim 7. By providing flaps 9 and 10, pressure of the tube as it is inflated causes the flaps 9 and 10 to move pivotally relative to the joints 11 and 12 and to form a wall of rubber which functions as a protective medium over the joints between the beads of the tire and the rim. Pivot points formed by the joints 11 and 12 ordinarily remain in a substantially fixed position relative to the bead portions 14 and 15, respectively, of the tire, during the time that the inner tube is being inflated. Therefore, after the tube is inflated the flaps 9 and 10 remain in a substantially unstretched condition while the rim portion 13 of the inner tube stretches to suit the contour of the tire and rim, during which time it forms a sliding engagement with the flaps 9 and 10.

As thus shown and described, it is apparent that I have provided a novel flap arrangement in which the free ends of the flaps are positioned directly opposite to conventional flaps, with the result that as the rim portion of the inner tube stretches to fit the assembly, the sliding engagement of the inner tube with the flaps is directed from the base of the flaps toward their free ends, thus insuring a uniform relationship free from wrinkling or buckling such as occurs with conventional flap assemblies.

While I have shown a preferred embodiment of my invention, it is to be understood that it may be otherwise practiced within the scope of the appended claim.

Having thus described my invention, what I claim and desire to protect by Letters Patent is:

An inner tube comprising an endless tubular wall of elastic rubber composition and a pair of circumferentially extending flaps solely of soft elastic rubber composition integrally attached respectively to the opposite side walls thereof adjacent the rim engaging region, said flaps extending inwardly from their points of attachment toward the central plane of rotation of the tube and overlying the rim engaging region for forming with the rim engaging region double wall sections throughout those portions of the inner tube normally adjacent the junctions formed between an encasing tire and a supporting rim.

ERNST EGER.